United States Patent
Zhang et al.

(10) Patent No.: US 10,340,794 B1
(45) Date of Patent: Jul. 2, 2019

(54) REVERSE CAPACITOR VOLTAGE BALANCING FOR HIGH CURRENT HIGH VOLTAGE CHARGE PUMP CIRCUITS

(71) Applicant: Linear Technology LLC, Milpitas, CA (US)

(72) Inventors: Xu Zhang, Milpitas, CA (US); Zhouyuan Shi, Fremont, CA (US)

(73) Assignee: Linear Technology LLC, Milpitas, CA (US)

( * ) Notice: Subject to any disclaimer, the term of this patent is extended or adjusted under 35 U.S.C. 154(b) by 0 days.

(21) Appl. No.: 16/132,065

(22) Filed: Sep. 14, 2018

Related U.S. Application Data

(60) Provisional application No. 62/688,328, filed on Jun. 21, 2018.

(51) Int. Cl.
  *H02M 3/07* (2006.01)
  *H02M 3/158* (2006.01)
  *H02M 1/08* (2006.01)
  *H02M 1/36* (2007.01)

(52) U.S. Cl.
  CPC ............. *H02M 3/073* (2013.01); *H02M 1/08* (2013.01); *H02M 1/36* (2013.01); *H02M 3/158* (2013.01)

(58) Field of Classification Search
  CPC .......... H02M 1/08; H02M 1/088; H02M 1/36; H02M 3/073; H02M 3/158
  See application file for complete search history.

(56) References Cited

U.S. PATENT DOCUMENTS

| | | | |
|---|---|---|---|
| 5,754,482 A | 5/1998 | Su et al. | |
| 6,370,046 B1 | 4/2002 | Nebrigic et al. | |
| 6,738,272 B2 | 5/2004 | Yamanaka et al. | |
| 7,633,778 B2 * | 12/2009 | Mok | H02M 3/07 323/266 |

(Continued)

FOREIGN PATENT DOCUMENTS

| | | |
|---|---|---|
| JP | 2008099481 A | 4/2008 |
| KR | 20090071860 A | 7/2009 |
| KR | 20090103567 A | 10/2009 |

OTHER PUBLICATIONS

B. Haug, "72V Hybrid DC/DC Reduces Intermediate Bus Converter Size by up to 50%," Power Electronics, Jan. 29, 2018, pp. 1-9.

(Continued)

*Primary Examiner* — Matthew V Nguyen
(74) *Attorney, Agent, or Firm* — Schwegman Lundberg & Woessner, P.A.

(57) ABSTRACT

A switched capacitor converter includes a primary switching circuit, a flying capacitor circuit, and a secondary switching circuit. The primary switching circuit includes plurality of switching transistors in series. The flying capacitor circuit includes one or more flying capacitors with each flying capacitor connected to a switching transistor. The secondary switching circuit includes two or more switching transistors and provides a first path for charging and a second path for discharging the flying capacitors. At startup, the flying capacitors are discharged via a first current source while the switching transistors are turned off. After discharging, the flying capacitors are charged via a second current source, while a first switching transistor of the primary switching circuit is kept turned off and the rest of the switching transistors perform switching according to a switching cycle. After charging, the switched capacitor converter may enter a steady state operation.

20 Claims, 7 Drawing Sheets

(56) References Cited

U.S. PATENT DOCUMENTS

| | | | |
|---|---|---|---|
| 7,990,742 | B2 | 8/2011 | Lesso |
| 8,035,440 | B2 | 10/2011 | Hernandez-Garduno et al. |
| 8,089,788 | B2 * | 1/2012 | Jain .................. H02M 3/07 307/110 |
| 8,503,203 | B1 | 8/2013 | Szczeszynski et al. |
| 8,693,224 | B1 | 4/2014 | Giuliano |
| 8,710,903 | B2 * | 4/2014 | Oraw .................. G11C 5/147 327/337 |
| 8,817,501 | B1 | 8/2014 | Low et al. |
| 9,484,799 | B2 | 11/2016 | Zhang et al. |
| 9,998,000 | B2 | 6/2018 | Zhang et al. |
| 2009/0278520 | A1 * | 11/2009 | Perreault .............. H02M 3/07 323/282 |
| 2016/0028302 | A1 | 1/2016 | Low et al. |
| 2016/0211739 | A1 | 7/2016 | Hissink et al. |
| 2017/0055322 | A1 | 2/2017 | Jiang et al. |
| 2017/0085172 | A1 | 3/2017 | Low et al. |
| 2017/0300078 | A1 | 10/2017 | Puggelli et al. |
| 2018/0006559 | A1 | 1/2018 | Chen et al. |
| 2018/0019669 | A1 * | 1/2018 | Zhang .................. H02M 3/073 |

OTHER PUBLICATIONS

S. Bush, "Updated: ADI hits 500W with switched capacitor power converter," Electronics Weekly.com, Jul. 26, 2017, pp. 1-4.

E. Bonizzoni, "Algorithm for Automatic Design of Maximum-Efficiency Dickson Charge Pumps," pp. 1-4.

P. Papamanolis et al., "Behavior of the Flying Capacitor Converter Under Critical Operating Conditions," Power Electronic Systems Laboratory, IEEE, Jun. 19-21, 2017, pp. 1-9.

J. Li et al., "High Efficiency, High Density, Switched Capacitor Converter for High Power Applications," Design Features, Journal of Analog Innovation, Jul. 2017, pp. 9-11.

B. Macy et al., "A 1.2 MHz, 25 V to 100 V GaN-based Resonant Dickson Switched-Capacitor Converter with 1011 W/in3 (61.7 kW/L) Power Density," IEEE, 2015, pp. 1472-1478.

S. Thielemans et al., "Self-Precharge in Single-Leg Flying Capacitor Converters," IEEE, 2009, pp. 812-817.

S. Joshi et al., "Pre-charging of Module Capacitors of MMC When the Module Switches are Driven by a Source Derived from the Module Capacitor," pp. 1-6.

\* cited by examiner

US 10,340,794 B1

REVERSE CAPACITOR VOLTAGE BALANCING FOR HIGH CURRENT HIGH VOLTAGE CHARGE PUMP CIRCUITS

CROSS-REFERENCE TO RELATED APPLICATIONS

This application claims the benefit of priority under 35 U.S.C. § 119 from U.S. Provisional Patent Application 62/688,328 filed Jun. 21, 2018, which is incorporated herein by reference in its entirety.

FIELD OF THE DISCLOSURE

The disclosure relates generally to power converter circuits and, more particularly, to switched capacitor converter circuits.

BACKGROUND

A charge pump circuit is a type of switched capacitor circuit that may be used to convert a direct current (DC) input voltage to another DC voltage. A charge pump can be configured to generate an output voltage that is a multiple (e.g., 2, 3 . . . N times) the input voltage or it can set an output voltage that is a fraction thereof (e.g., ½, ⅓ . . . 1/N times of the input voltage). In some implementations, such circuit can also generate a negative output voltage from a positive input voltage. Since the charge pump circuit does not require inductors to do the voltage conversion, it is sometimes referred as an inductor-less DC/DC converter.

A shortcoming of existing direct current converters is that they may have a large inrush current in sensitive circuit elements, such as switching transistors.

Accordingly, what is needed is a design for a higher efficiency converter, without adding considerable cost and complexity, which can limit a current of the switching transistors.

SUMMARY OF THE DISCLOSURE

A switched capacitor converter includes a primary switching circuit, a flying capacitor circuit, and a secondary switching circuit. The primary switching circuit includes a plurality of switching transistors in series that may switch, e.g., turn on or off, according to a switching cycle. The flying capacitor circuit includes one or more flying capacitors with each flying capacitor connected from one end to a node between two linked switching transistors of the primary switching circuit. The secondary switching circuit includes two or more switching transistors and provides a first path for charging the one or more flying capacitors and a second path for discharging the one or more flying capacitors. At startup, the one or more flying capacitors are discharged via a first current source that is coupled to at least one of the one or more flying capacitors and while the switching transistors of the primary and secondary switching circuits are turned off. After discharging, the one or more flying capacitors are charged via a second current source that is coupled to at least one of the one or more flying capacitors, while at least a first switching transistor of the primary switching circuit is kept turned off, the rest of the switching transistors of the primary switching circuit and the switching transistors of the secondary switching circuit perform switching according to the switching cycle. After charging, the switched capacitor converter may enter a steady state operation. The plurality of switching transistors of the primary switching circuit and the two or more switching transistors of the secondary switching circuit perform switching while the first and second current sources are disconnected from the switched capacitor converter. In some examples, the plurality of switching transistors of the primary switching circuit includes two or more switching transistors, e.g., at least three switching transistors.

A switched capacitor converter according to various implementations includes a primary switching circuit. The primary switching circuit includes a plurality of switching transistors connected in series, an output capacitor, and one or more flying capacitors that includes a first flying capacitor. The switched capacitor converter also includes a pre-balancing circuit that includes a first comparator circuit of one or more comparator circuits. The first comparator circuit may monitor a voltage of the first flying capacitor of the primary switching circuit. When the voltage of the first flying capacitor is outside a first voltage range, the first comparator circuit may activate a first current source of one or more current sources coupled to the first flying capacitor to discharge the first flying capacitor. The discharging may continue until the voltage of the first flying capacitor is within the first voltage range for a predetermined first amount of time. The first comparator circuit may keep the plurality of switching transistors of the primary switching circuit turned off when the first current source is activated. The pre-balancing circuit also includes a second comparator circuit of the one or more comparator circuits that may monitor a voltage of the output capacitor of the primary switching circuit. When the voltage of the output capacitor is outside a second voltage range, the second comparator circuit may activate a second current source of the one or more current sources coupled to the first flying capacitor to charge the first flying capacitor. The charging may continue until the voltage of the output capacitor is within the second voltage range for a predetermined second amount of time. When the second current source is activated, the second comparator circuit may keep at least one of the plurality of switching transistors of the primary switching circuit turned off and may turn on or off a rest of the switching transistors of the primary switching circuit according to a switching cycle.

A method of operating a switched capacitor converter according to various implementations comprises monitoring a voltage of a first flying capacitor of one or more flying capacitors of a primary switching circuit of the switched capacitor converter. The primary switching circuit may include a plurality of switching transistors. The method includes discharging the first flying capacitor in response to determining the voltage of the first flying capacitor is outside a first voltage range. The plurality of switching transistors of the primary switching circuit may be turned off when discharging. The method includes ending the discharging of the first flying capacitor in response to determining the voltage of the first flying capacitor of the switched capacitor converter is within the first voltage range for a predetermined first amount of time. The method also includes monitoring a voltage of an output capacitor of the switched capacitor converter and charging the first flying capacitor in response to determining the voltage of the output capacitor is outside a second voltage range. At least one of the plurality of switching transistors of the primary switching circuit is turned off when charging and a rest of the plurality of switching transistors of the primary switching circuit turn on or off according to a switching cycle when charging. The method further includes ending the charging of the first flying capacitor in response to determining the voltage of the output capacitor of the switched capacitor converter is within the second voltage range for a predetermined second amount of time. When charging ends, the turning on or off of the plurality of switching transistors of the primary switching circuit may continue according to the switching cycle.

A switched capacitor converter according to various implementations includes means for turning off switching transistors of a primary switching circuit when discharging begins and means for monitoring a voltage of a first flying capacitor. The switched capacitor converter includes means for discharging the first flying capacitor in response to determining the voltage of the first flying capacitor is outside a first voltage range. The switched capacitor converter also includes means for ending the discharging of the first flying capacitor in response to determining the voltage of the first flying capacitor of the switched capacitor converter is within the first voltage range for a predetermined first amount of time. The switched capacitor converter includes means for charging the first flying capacitor in response to determining the voltage of an output capacitor is outside a second voltage range. The switched capacitor converter includes means for ending the charging of the first flying capacitor in response to determining the voltage of the output capacitor of the switched capacitor converter is within the second voltage range. The switched capacitor converter further includes means for start switching on or off the switching transistors of the primary switching circuit according to a switching cycle when charging stops.

Other aspects disclosed herein include corresponding methods, systems, apparatuses, and electronic device products for implementation of the switched power converter. It is understood that other configurations will become readily apparent to those skilled in the art from the following detailed description, wherein various exemplary configurations and implementations are shown and described by way of illustration.

BRIEF DESCRIPTION OF THE DRAWINGS

The accompanying drawings are presented to aid in the description of example aspects and are provided solely for illustration of embodiments and not limitation thereof.

DETAILED DESCRIPTION

Figure 1A:
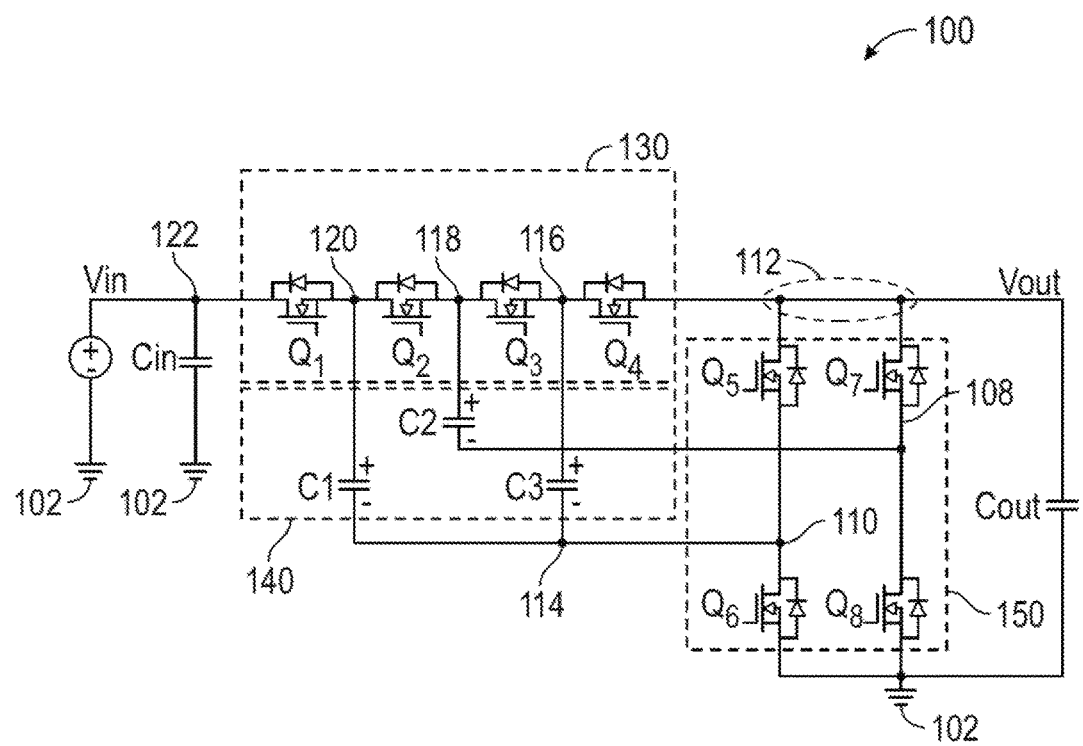
FIG. 1A is a circuit diagram of an exemplary switched capacitor converter, according to some embodiments.

Aspects and features, and exemplary implementations practices and applications are disclosed in the following description and related drawings. Alternatives to disclosed examples may be devised without departing from the scope of disclosed concepts.

The term "converter," as used herein, encompasses but is not limited to any one of, or any combination of "regulator," "DC regulator," "voltage regulator," "DC voltage regulator," "DC-DC converter," "DC converter" and "converter," and includes, but is not limited to, the plain meaning of any one or more of these terms.

The subject disclosure provides a switched capacitor converter that includes a primary switching circuit, a flying capacitor circuit, and a secondary switching circuit.

The subject disclosure provides a switched capacitor converter that includes a primary switching circuit a flying capacitor circuit, and a secondary switching circuit. The primary switching circuit may include four switching circuits in series that may switch, e.g., turn on or off, according to a switching cycle. The flying capacitor circuit may include three flying capacitors with each flying capacitor connected from one end to a node between two linked switching transistors of the primary switching circuit. The secondary switching circuit may include four switching transistors and provides a first path for charging the three flying capacitors and also provide a second path for discharging the three flying capacitors. At startup, the three flying capacitors are discharged via a first current source that is coupled to at least one of the three flying capacitors. The discharging may discharge the three flying capacitors through body diodes of the switching circuits of primary and secondary switching circuits. The end of discharging period may be determined by comparing a voltage of one of the flying capacitors with a predefined voltage level close to ground voltage (zero). After discharging, the three flying capacitors are charged via a second current source that is coupled to at least one of the three flying capacitors. During the charging, one of the switching transistor of the primary switching circuit is kept turned off and the rest of the switching transistors of the primary switching circuit and the switching transistors of the secondary switching circuit may perform switching according to the switching cycle. The charging may include charging an output capacitor. After charging the flying capacitors and the output capacitor to predetermined voltages levels, the switched capacitor converter may enter a steady state operation. Although, the three flying capacitors and the output capacitor are charged, the end of charging period may be determined by comparing a voltage of the output capacitor with a predefined voltage. In steady state operation, the four switching transistors of the primary switching circuit and the four switching transistors of the secondary switching circuit may perform switching while the first and second current sources are disconnected from the switched capacitor converter.

FIG. 1A is a circuit diagram of an exemplary switched capacitor converter, according to some embodiments. In some embodiments, switched capacitor converter 100 is a Dickson charge pump circuit. FIG. 1A includes an exemplary switched capacitor converter 100 that includes primary switching circuit 130, flying capacitor circuit 140, and secondary switching circuit 150. In some embodiments, an input voltage Vin is coupled to primary switching circuit 130. In some embodiments, primary switching circuit 130 includes four switching transistors Q1, Q2, Q3, and Q4 that are connected in series via nodes 116, 118, and 120. Each of the nodes 116, 118, and 120 may link two of the adjacent transistors. Switching transistors Q1, Q2, Q3, and Q4 may switch on or off according to a switching cycle. The switching cycle may include two or more switching signals with two or more duty cycles. The two or more switching signals may be coupled to switching transistors Q1, Q2, Q3, and Q4 and turn the switching transistors Q1, Q2, Q3, and Q4 on or off at a predetermined switching frequency with a different duty cycle for each switching signal of the two or more switching signals. In some embodiments, one of the duty cycles can be inverse of another one and thus at least two switching signal may switch on or off the switching transistors of primary switching circuit 130 in phase opposition, e.g., complementary to each other.

In some embodiments switching transistors Q1 and Q3 of primary switching circuit 130 may switch on or off complementary to switching transistors Q2 and Q4 of primary switching circuit 130. In some examples, switching transistors Q1 and Q3 may switch on for a duration of Ton and may switch off for a duration of Toff, providing duty cycle D=Ton/(Ton+Toff) for switching transistors Q1 and Q3. In some examples switching transistors Q1 and Q3 and switching transistors Q2 and Q4 may be switched at a 50% duty cycle, such that the switching transistors Q1 and Q3 is switched on or off in phase opposition to switching transistors Q2 and Q4 for exactly the same time period. In some examples, the duty cycle D of the switching transistors Q1 and Q3 is less than 50% and the duty cycle of the switching transistors Q2 and Q4 is more than 50% or vice versa. In some embodiments, switching transistors Q1, Q2, Q3, and Q4 of primary switching circuit 130 may not switch on or off and may stay turned off.

Switched capacitor converter 100 also includes flying capacitor circuit 140 that includes three flying capacitors C1, C2, and C3 where each one of the flying capacitors are coupled, from one end, to one of the nodes 116, 118, and 120 of the primary switching circuit. In some embodiment, an input capacitor Cin is connected between node 122 (first end) of primary switching circuit 130 and ground 102. In some embodiments, an output capacitor Cout is connected between node 112 (second end) of primary switching circuit 130 and ground 102. In some embodiments, a voltage across capacitor Cout may be provided as an output voltage of the switched capacitor converter 100. In some embodiments, input voltage Vin is coupled across input capacitor Cin such that Vin is coupled between node 122 of primary switching circuit 130 and ground 102.

Switched capacitor converter 100 additionally includes secondary switching circuit 150 that includes switching transistors Q5, Q6, Q7, and Q8. In some embodiments, switching transistors Q5, Q6, Q7, and Q8 of secondary switching circuit 150 and switching transistors Q1, Q2, Q3, and Q4 of primary switching circuit 130 may not switch on or off and may stay turned off for a predetermined first amount of time or until one or more predetermined first conditions in the switched capacitor converter 100 are satisfied. In some embodiments, switching transistors Q5, Q6, Q7, and Q8 of secondary switching circuit 150 and switching transistors Q2, Q3, and Q4 of primary switching circuit 130 may switch on or off for a predetermined second amount of time or until one or more predetermined second conditions in the switched capacitor converter 100 are satisfied. In some embodiments, switching transistors Q5, Q6, Q7, and Q8 of secondary switching circuit 150 and switching transistors Q1, Q2, Q3, and Q4 of primary switching circuit 130 may start to switch on or off after the predetermined second amount of time or after the one or more predetermined second conditions in the switched capacitor converter 100 are satisfied. In some examples, after the predetermined second amount of time or after the one or more predetermined second conditions in the switched capacitor converter 100 are satisfied, the switched capacitor converter 100 may enter a steady state stage operation.

In some embodiments, in the steady state stage operation of switched capacitor converter 100 switching transistor Q1-Q8 may turn on or off according to the switching cycle to charge and discharge flying capacitors C1, C2, and C3, as well as the output capacitor Cout, to keep the output voltage at an essentially constant value. In some examples, switched capacitor converter 100 is used to divide the input voltage Vin by four such that output voltage Vout, across output capacitor Cout, is ¼ Vin.

In some embodiments, e.g., in the steady state operation of switched capacitor converter 100, switching transistors Q1, Q3, Q5, and Q8 may turn on and off at the same time with around 50% duty cycle where switching transistors Q2, Q4, Q6, and Q7 are turned on and off at phase opposition, e.g., complementary, to switching transistors Q1, Q3, Q5, and Q8. In some examples, flying capacitors C1, C2, C3 and output capacitor Cout are pre-balance, e.g., pre-charged, before steady state operation of switched capacitor converter 100. In some embodiments, the switching transistors are MOSFETs and have a very low on-resistance Rds between drain and source and thus an imbalance between voltages of capacitors C1, C2, C3 and Cout may generate a large current through one or more of the switching transistors. The pre-balancing may minimize the inrush currents between capacitors C1, C2, C3, and Cout that may pass through the switching transistors.

In some examples, a voltage and/or current, e.g., an output voltage and/or an output current of a switched capacitor converter, or a voltage or current of an element of a switched capacitor converter, e.g., switched capacitor converter 100, may be defined as within a percent range (e.g., 20 percent above or below) of a voltage value and/or current value. By defining a voltage and/or current within the percent range, that voltage and/or current may be defined as an essentially constant voltage value and/or current value.

Figure 1B:
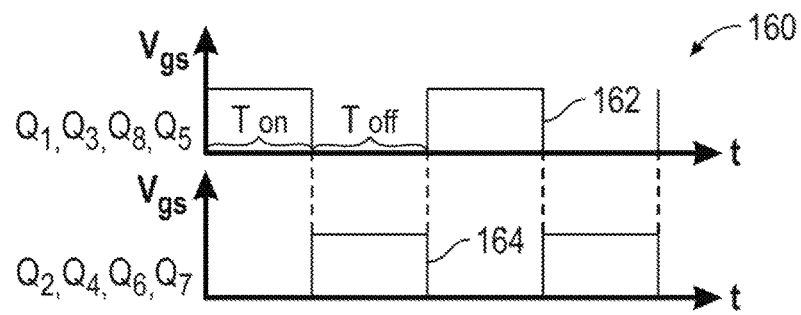
FIG. 1B is a diagram of a switching cycle of the exemplary switched capacitor converter, according to some embodiments.

FIG. 1B is a diagram of a switching cycle of the exemplary switched capacitor converter, according to some embodiments. In some examples, switching cycle 160 includes two switching signals 162 and 164. In some examples, switching signal 162 turns on or off switching transistors Q1, Q3, Q5, and Q8 and switching signal 164 turns on or off switching transistors Q2, Q4, Q6, and Q7. Power flow between flying capacitors of capacitor circuit 140 and also power flow to the output capacitor Cout may be controlled by changing the switching duty cycle of switching transistors Q1, Q3, Q5, and Q8 and also switching transistors Q2, Q4, Q6, and Q7 (e.g., by changing the duty cycle of the switching signals 162 and 164). In some examples, the switching cycles have a switching frequency of 200 KHz to 600 KHz, e.g., 500 KHz.

Figure 2:
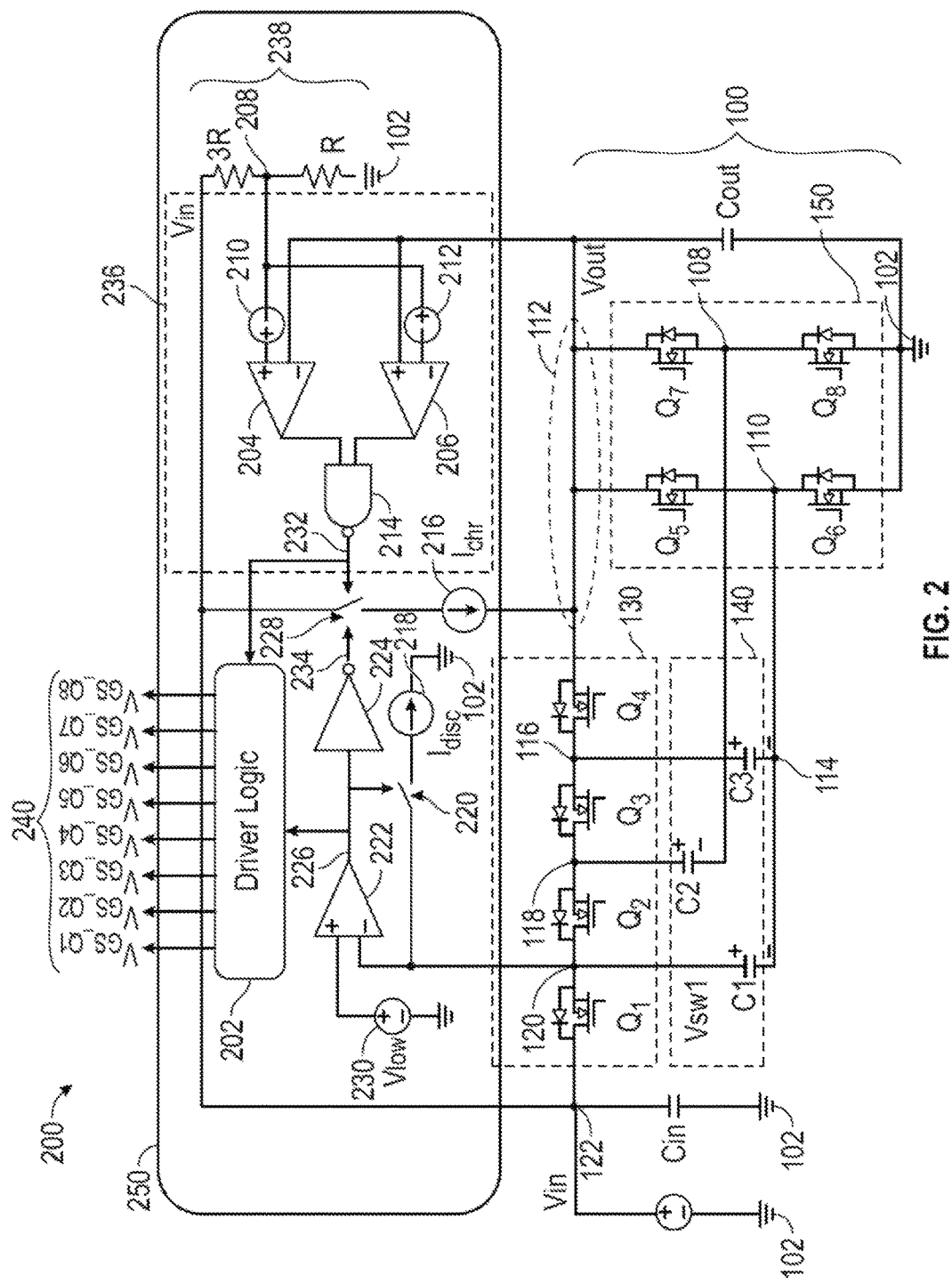
FIG. 2 is a circuit diagram of an exemplary switched capacitor converter with a pre-balancing circuit, according to some embodiments.

FIG. 2 is a circuit diagram of an exemplary switched capacitor converter with a pre-balancing circuit, according to some embodiments. FIG. 2 includes circuit 200 that comprises switched capacitor converter 100 of FIG. 1A and pre-balancing circuit 250, e.g., a reverse capacitor voltage balancing system, which is couple to switched capacitor converter 100. In some embodiments, pre-balancing circuit 250 includes comparator system 236, comparator 222, logic circuit 202, current source 216, current source 218, voltage source 230, NOT circuit 224 (NOT gate), switch 220, and switch 228.

In some embodiments, comparator 222 is coupled from a negative node to node 120 of primary switching circuit 130 of switched capacitor converter 100 and from a positive node to voltage source 230 having a reference voltage Vlow. Comparator 222 may sample a voltage of switching transistor Q1 at node 120, e.g., Vsw1, and may compare Vsw1 with the reference voltage Vlow. Thus, in some examples, when Vsw1 is larger than Vlow, output 226 of comparator 222 is set to low and when the Vsw1 is smaller than Vlow, output 226 of comparator 222 is set to high. In some examples Vlow is a low voltage between 1 volt and zero, e.g., 0.5 volts. Thus when Vsw1 is larger than 0.5 volts, output 226 of comparator 222 is set to low and when the Vsw1 is smaller than 0.5 volts, output 226 of comparator 222 is set to high. In some embodiments, switching transistor Q6 of secondary switching circuit 150 is turned off. Thus, flying capacitor C1 that is coupled between node 120 of primary switching circuit 130 and switching transistor Q6, is coupled, through body diode of switching transistor Q6, between node 120 and ground 102. Thus, in some examples, Vsw1 is a voltage of a top plate of flying capacitor C1.

Pre-balancing circuit 250 also includes switch 220 and current source 218 that has a current discharging value Idisc. In some embodiments, output 226 of comparator 222 may be coupled to switch 220. Current source 218 may be coupled between node 120 and ground 102 via switch 220 and may draw current Idisc from node 120 when switch 220 is closed. When a voltage Vsw1 of flying capacitor C1 is larger than Vlow, output 226 of comparator 222 may be set to low and comparator 222 may cause switch 220 to be closed. In some embodiments, when switch 220 is closed the switching transistors Q1-Q8 are turned off and thus current source 218 may discharge flying capacitor C1 through body diode of switching transistor Q6 that couples flying capacitor C1 to ground 102. In some embodiments, by closing switch 220, current source 218 may also discharge flying capacitors C2 and C3 through body diodes of switching transistors Q2, Q3, Q6, and Q8.

In some embodiments, pre-balancing circuit 250 further includes NOT circuit 224 that is coupled to output 226 of comparator 222. In some embodiments, NOT circuit 224 provides an output 234 that is an inverse of an input to NOT circuit 224 which is output 226 of comparator 222. Thus, when output 226 of comparator is high, output 234 of NOT circuit is low and vice versa. Current source 216 is coupled between nodes 122 and 112 of primary switching circuit 130 of switched capacitor converter 100 via switch 228. Output 234 of NOT circuit 224 may be coupled to switch 228 and thus when output 234 is sent to high, NOT circuit 224 may cause switch 228 to open and to stop current source 216 from providing current Ichr at node 112. In some embodiments, comparator 222 is coupled from a positive node to node 120 and from a negative node to voltage source 230. Thus when Vsw1 is larger than Vlow, output 226 of comparator 222 is set to high and when the Vsw1 is smaller than Vlow, output 226 of comparator 222 is set to low. Thus, switch 220 may be closed when output 226 of comparator 222 is set to high and switch 228 may be opened when output 234 of NOT circuit is set to low and vice versa. In some examples, output 226 of comparator 222 is inverse of output 234 of NOT circuit. In some examples, when switch 220 is closed and flying capacitors C1, C2, and C3 are discharging, switch 228 is open and current source 216 may not supply current to node 112.

In some embodiments, pre-balancing circuit 250 also includes logic circuit 202 that may create signals VGS_Q1-VGS_Q8 that may be coupled to gates of transistor Q1-Q8 and may turn on or off the transistors Q1-Q8. In some embodiments, as discussed, voltage Vsw1, is the voltage of the top plate of flying capacitor C1 and when Vsw1 is above Vlow, comparator 222 may command logic circuit 202 to turn off all the switching transistors Q1-Q8. At the same time, output 226 of comparator 222 may command switch 220 to close and create a path for discharging C1 to ground 102 using current source 218 having Idisc. Additionally, by receiving the output 226 of comparator 222, NOT circuit 224 may command switch 228 to open and to disconnect current source 216 from node 112. Thus, during discharge of C1, charging current source 216 may not supply current Ichr through node 112. In some examples, as discussed discharging of the flying capacitors C2 and C3 happens through body diodes of the transistors Q2, Q3, Q6, and Q8. In some embodiments, there may be other path (not shown) to connect flying capacitors C1, C2, and C3 to ground 102 and to discharge flying capacitors C1, C2, and C3 through nodes 120, 118 and 116 via current source 216 or other current sources. In some examples, when the voltage of the top plate of flying capacitor C1 goes below Vlow, output 226 of comparator 222 goes low and switch 220 is opened and discharging of flying capacitors stops. In some embodiments, more discharge current sources may be coupled to nodes 112, 116, and 118 (not shown) to speed up the discharging of the flying capacitor and the output capacitor.

In some embodiments, pre-balancing circuit 250 includes comparator system 236 which includes comparator 204, comparator 206, hysteresis voltage source 210, hysteresis voltage source 212, and NAND gate 214. A negative input of comparator 206 and a positive input of comparator 204 may be coupled to node 208, e.g., a voltage divider node, of voltage divider 238.

In some embodiments, voltage divider 238 is coupled between node 122 of primary switching circuit 130 and ground 102. In some examples, voltage divider 238 may include resistors 3R and R in series and may provide, at node 208, a fraction, e.g., one fourth, of a voltage between node 122 and ground. As discussed, node 122 of primary switching circuit 130 may be coupled to input voltage Vin and thus node 208 may provide a desired voltage of ¼ Vin and thus comparator 204 and comparator 206 may be coupled to ¼ Vin from one input. In some embodiments, comparator 204 and comparator 206 are coupled from another input to output voltage Vout. Outputs of comparator 204 and comparator are inputs of NAND gate 214 that provides output 232 of NAND gate 214. In some examples, when Vout is less than ¼ Vin, output of comparator 204 is low and output of comparator 206 is high and thus output of NAND gate 214 is high. As shown in FIG. 2, output 232 of NAND gate 214 is coupled to switch 228. When output 232 of NAND gate 214 is high, switch 228 may be commanded to be closed and current source 216 may be connected between nodes 112 and 122 of primary switching circuit 130. When switch 228 is closed, current Ichr may be delivered to node 112 of primary switching circuit 130. In some embodiments, output 232 of NAND gate 214 is also coupled to logic circuit 202 and when output 232 is high, logic circuit 202 may be commanded to turn on or off a subset of the switching transistors Q1-Q8 and to keep a rest of the switching transistors Q1-Q8 turned off. In some examples, when output 232 is high, logic circuit 202 may be commanded to turn on or off switching transistors Q2-Q8 and keep switching transistor Q1 turned off. Thus, when output 232 is high current Ichr, delivered to node 112, may charge flying capacitors C1, C2, and C3 through turning switching transistors Q2-Q8 on or off. In some examples, during charging of flying capacitors, one or more other current source (not shown) may be coupled to primary switching circuit 130 nodes 118 and 116 to speed up charging of flying capacitors C1, C2, and C3 to predetermined voltages. In some examples, current source 218 and 216 have a current between 50 mA and 200 mA, e.g., 100 mA. In some embodiments, C1 may be pre-charged to a predetermined value of ¾ Vin, C2 may be pre-charged to ½ Vin and C3 may be pre-charged to ¼ Vin.

In some examples, output voltage Vout is provided between node 112 and ground 102. When output voltage Vout is equal to desired voltage ¼ Vin, output 232 of NAND gate 214 is low and switch 228 is commanded to be opened and charging current Ichr may be disconnected from node 112 of primary switching circuit 130. In some embodiments, when output 232 of NAND gate 214 is low, logic circuit 202 may be commended to also turn on or off the switching transistor Q1 such that switching transistors Q1-Q8 are turned on or off according to the switching cycle.

In some embodiments, as shown in FIG. 2, comparator 204 and comparator 206 may have hysteresis voltage source 210 and hysteresis voltage source 212 respectively attached, in series, to input nodes of comparator 204 and comparator 206. Hysteresis voltage sources may be a fraction, e.g., one tenth, of the desired voltage. Hysteresis voltage sources thus may create a predefined range, e.g., plus and minus ten percent, around the desired voltage such that output 232 of NAND gate 214 is low when output voltage is within the predefined range and output 232 of NAND gate 214 is high when output voltage is outside the predefined range. In some embodiments, Hysteresis voltage sources in addition to providing an acceptable lower bound and upper bound for the output voltage around the desired voltage, prevent oscillation of switch 228 due to variations of output voltage Vout due to noise.

In some embodiments, a failure of one of more switching transistors of primary switching circuit 130 may be detected if during pre-balancing, Vsw1 may not be discharged below Vlow after a long period, e.g., 10 seconds. Or, if during pre-balancing Vout is never charged up to within the desired voltage for a long period, e.g., 10 seconds.

Figure 3A:
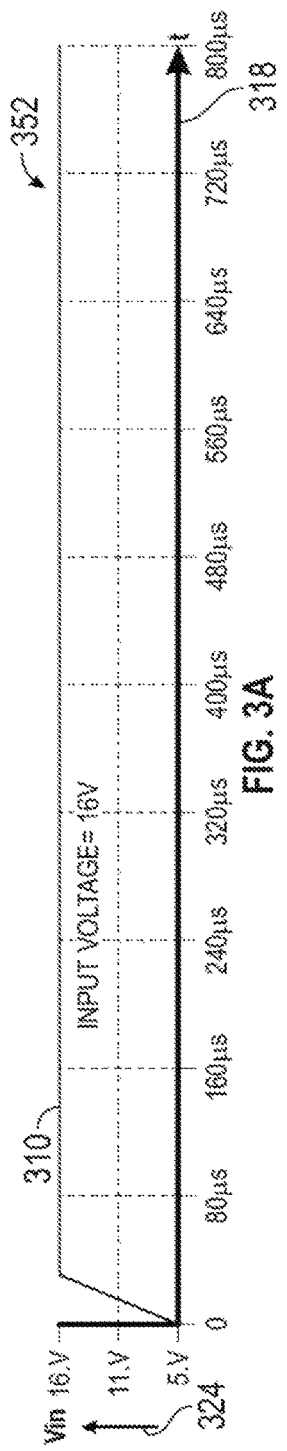
FIGS. 3A-3C are startup waveforms of an exemplary switched capacitor converter, according to some embodiments.
Figure 3B:
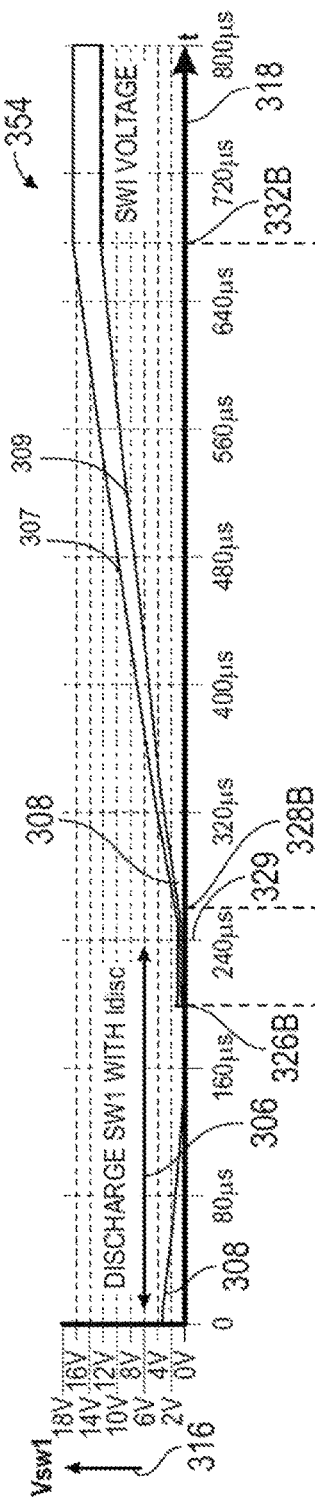
Figure 3C:
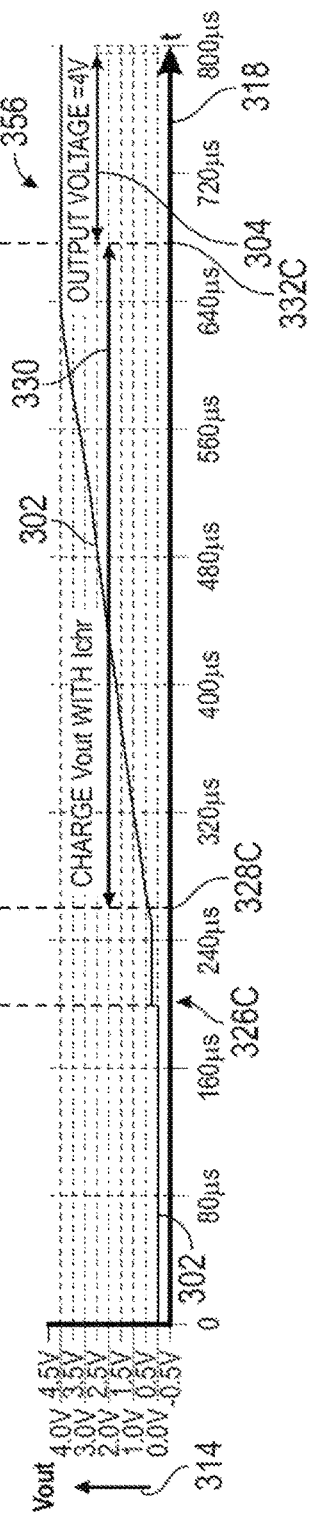

FIGS. 3A-3C are startup waveforms of an exemplary switched capacitor converter, according to some embodiments. Diagram 352 of FIG. 3A shows voltage graph 310 of input voltage Vin at startup of a switched capacitor converter, e.g., switched capacitor converter 100 of FIGS. 1A and 2. Vertical coordinate 324 shows voltage values and horizontal coordinate 318 shows time. As shown in FIG. 3A, vertical coordinate 324 is limited between 5 volts and 16 volts and horizontal coordinate 318 is limited between zero to 800 micro seconds. As discussed input voltage Vin is coupled to switched capacitor converter 100 via input capacitor Cin. At startup, when input voltage Vin is connected to switched capacitor converter 100, capacitor Cin is rapidly charged to Vin and input voltage rapidly, e.g., with a rise time of less 50 micro seconds, increases to 16 volts.

Diagram 354 of FIG. 3B shows voltage graph 308 of a voltage of node 120 (e.g., Vsw1) of primary switching circuit 130 at startup of switched capacitor converter 100. Vertical coordinate 316 shows voltage values and horizontal coordinate 318 shows time. As shown in FIG. 3B, vertical coordinate 316 is limited between 0 volts and 18 volts and horizontal coordinate 318 is limited between zero to 800 micro seconds. As shown in FIG. 3B, at around zero seconds, voltage Vsw1 is about 3.5 volts and thus is more than Vlow of 0.5 volts. Therefore, at about t=0 seconds, output 226 of comparator 222 is set to low and switch 220 closes and current source 218 is connected between node 120 of primary switching circuit 130 and ground 102. Thus flying capacitor C1 is discharged using Idisc of current source 218. Also, at about t=0 seconds, output 226 of comparator 222 that is low is coupled to logic circuit 202 and thus output 226 of comparator 222 may command logic circuit 202 to turn off switching transistors Q1-Q8. At about t=0 seconds, output 234 of NOT circuit 224 that is coupled to switch 228 may command switch 228 to open. By opening switch 228 at about t=0 seconds, charging current Ichr is disconnected from primary switching circuit 130. In some embodiments, flying capacitor C1 is coupled to ground 102 via switching transistor Q6. As described switching transistors Q1-Q8 including switching transistor Q6 are turned off at t=0 seconds and thus discharging of flying capacitor C1 may happen via a body diode of switching transistor Q6. Thus, graph 308 shows that during discharging interval 306 voltage Vsw1 is decreasing from about 3.5 volts at t=0 to about zero volts at a time instance 326B on horizontal coordinate 318 of FIG. 3B.

In some embodiments, as shown in FIG. 3B, discharging interval 306 does not end at time instance 326B and continues until a time instance 329 on horizontal coordinate 318 of FIG. 3B. In some embodiments, at time instance 326B, switching transistors Q2-Q8 start turning on or off according to a switching cycle, e.g., switching cycle 160 of FIG. 1B and switching transistor Q1 continues to stay turned off. In an interval of time between time instance 326B and the time instance 329, switch 220 is closed and discharging continues, switch 228 is open, switching transistor Q1 is turned off and switching transistors Q2-Q8 may turn on or off. During the interval of time between time instance 326B and time instance 329 that may last between 15 to 30 cycles of the switching signals 162 or 164, Vsw1 may be monitored to make sure Vsw1 stays below Vlow. In some embodiments, at time instance 329, switch 220 is opened and discharging stops. In some embodiments, at time instance 328B, switch 228 is closed and charging of the flying capacitors may begin. In another interval of time between time instance 329 and time instance 328B, discharging of flying capacitors stops and charging of flying capacitors has not started, switching transistor Q1 is turned off and switching transistors Q2-Q8 may turn on or off.

In some embodiments, during the interval of time between time instance 329 and time instance 328B that may last between 10 to 20 cycles of the switching signals 162 or 164, Vsw1 may be monitored to make sure Vsw1 stays below Vlow. In some embodiments, if Vsw1 stays below Vlow during both intervals of time between time instance 326B and time instance 329 and also between time instance 329 and time instance 328B, then switch 228 may be closed and charging of the flying capacitors may begin at time instance 328B. In some embodiments, Vsw1 may not stay below Vlow during either of intervals of time between time instance 326B and time instance 329 or between time instance 329 and time instance 328B. Then discharging of flying capacitors may resume by output 226 of comparator 222 going low, switch 220 becoming closed, switch 228 becoming opened, and turning off switching transistors Q1-Q8. In some examples, the switching frequency is about 500 KHz and thus a cycle of the switching signals is about 2 micro seconds. In some embodiments, as shown in FIG. 3B, graph 308 of voltage Vsw1 may increase in an interval between time instance 328B and time instance 332B. As noted at time instance 328B, switch 228 is closed and charging of the flying capacitors and output capacitor Cout may begin. Thus, in the interval between time instance 328B and time instance 332B, switch 220 may remain open, switch 228 may remain closes, switching transistors Q2-Q8 may continue turning on or off according to switching cycle 160. Thus, in the interval between time instance 328B and time instance 332B, charging of flying capacitors C1, C2, and C3, and also charging of output capacitor Cout may continue. As noted, the switching signals may have a switching frequency of about 500 KHz. Turning off or on the switching transistors Q2-Q8 with the switching frequency of 500 KHz may induce a variation with at least the same frequency of 500 KHz on the voltages of the flying capacitors including the voltage Vsw1 of the top plate of flying capacitor C1. Therefore, as shown in FIG. 3B, variations with the switching frequency, e.g., 500 KHz, may exist on top of voltage graph 308 after switching transistors start turning on or off. In some examples, voltage graph 308 oscillates between level 307 and 309 as shown in FIG. 3B. In some embodiment, at time instance 332B output voltage Vout reaches the desired voltage, e.g., reaches ¼ Vin or 4 volts. After time instance 332B, switched capacitor converter 100 ends startup period and steady state operation starts. After time instance 332B, switch 228 opens, switch 220 stays open, and switching transistor Q1 in addition to switching transistors Q2-Q8 turns on or off according to switching cycle 160.

Diagram 356 of FIG. 3C shows voltage graph 302 of output voltage Vout at startup of switched capacitor converter 100. Vertical coordinate 314 shows voltage values and horizontal coordinate 318 shows time. As shown in FIG. 3C, vertical coordinate 314 is limited between −0.5 volts and 4.5 volts and horizontal coordinate 318 is limited between zero to 800 micro seconds. Voltage graph 302 shows that output voltage Vout remains at about zero volts between start up time t=0 until time instance 326C which corresponds to time instance 326B of FIG. 3B when switching transistors Q2-Q8 start turning on or off according to switching cycle 160. At time instance 326C, when switching transistors Q2-Q8 start turning on or off according to switching cycle 160, output voltage Vout slightly jumps to a value of about but less than 0.5 volts. Output voltage Vout stays about the same value until time instance 328C when switch 228 is closed and charging interval 330 for charging of the flying capacitors and the output capacitor begins. At time instance 332C which corresponds to time instance 332B of FIG. 3B, switching transistor Q1 may start turning on or off in addition to switching transistors Q2-Q8 that continue turning on or off according to switching cycle 160. In some embodiments, at time instance 332C, output voltage Vout reaches the desired voltage, e.g., reaches ¼ Vin or 4 volts, charging interval 330 ends and steady state operation interval 304 starts.

Figure 4A:
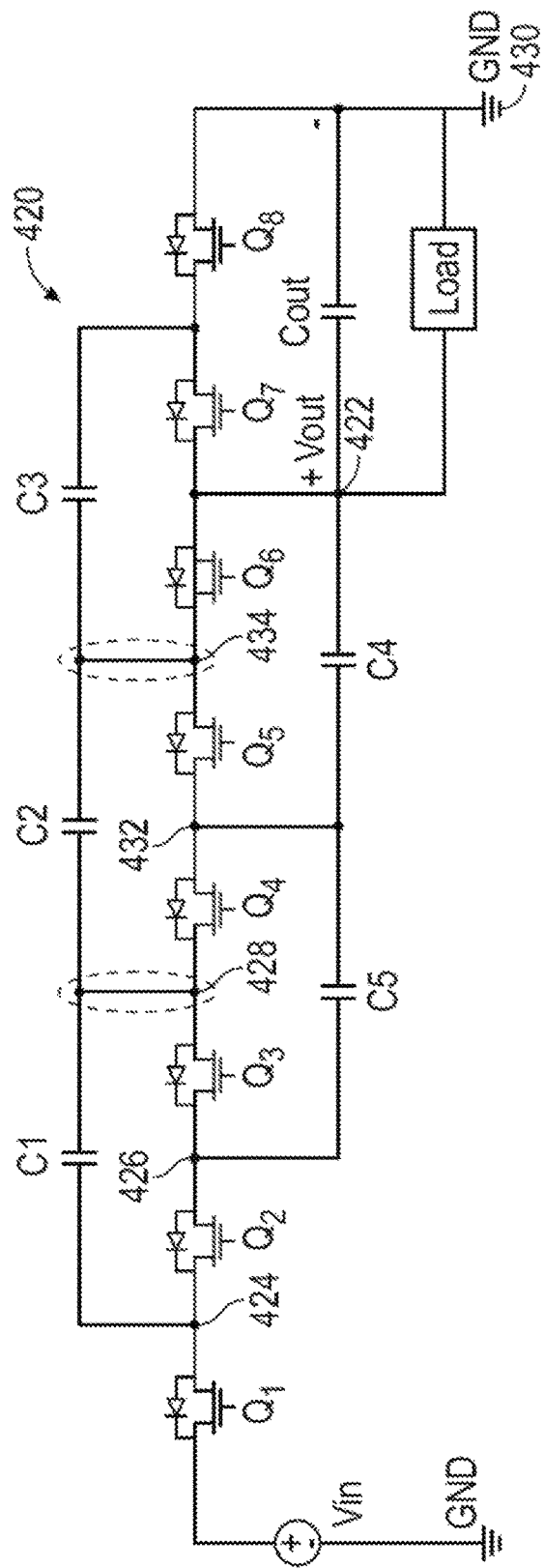
FIGS. 4A-4C are circuit diagrams of exemplary switched capacitor converters, according to some embodiments.
Figure 4B:
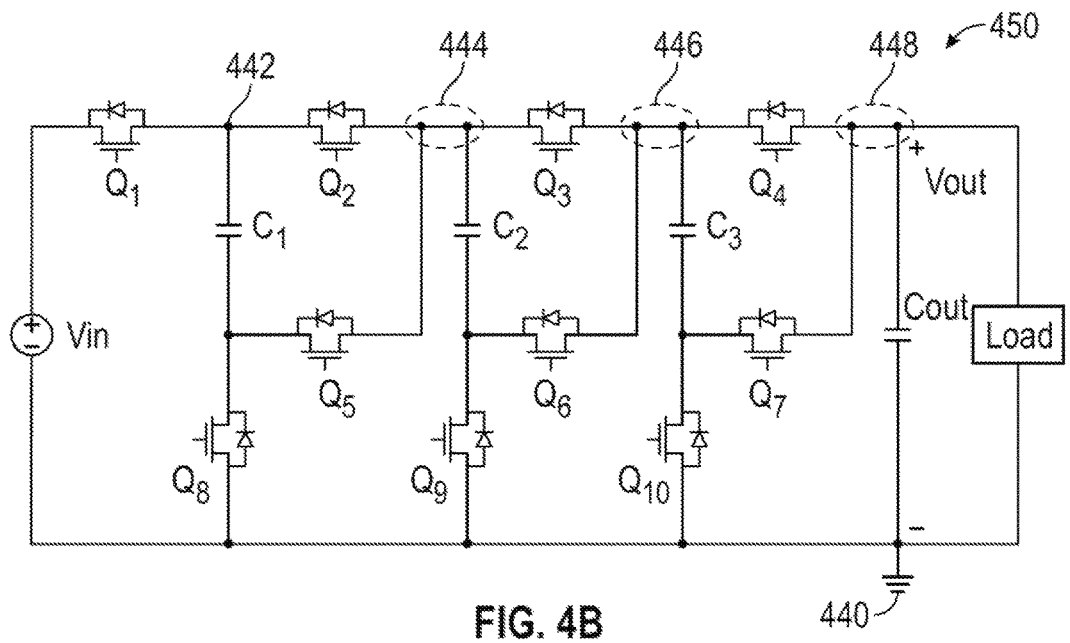
Figure 4C:
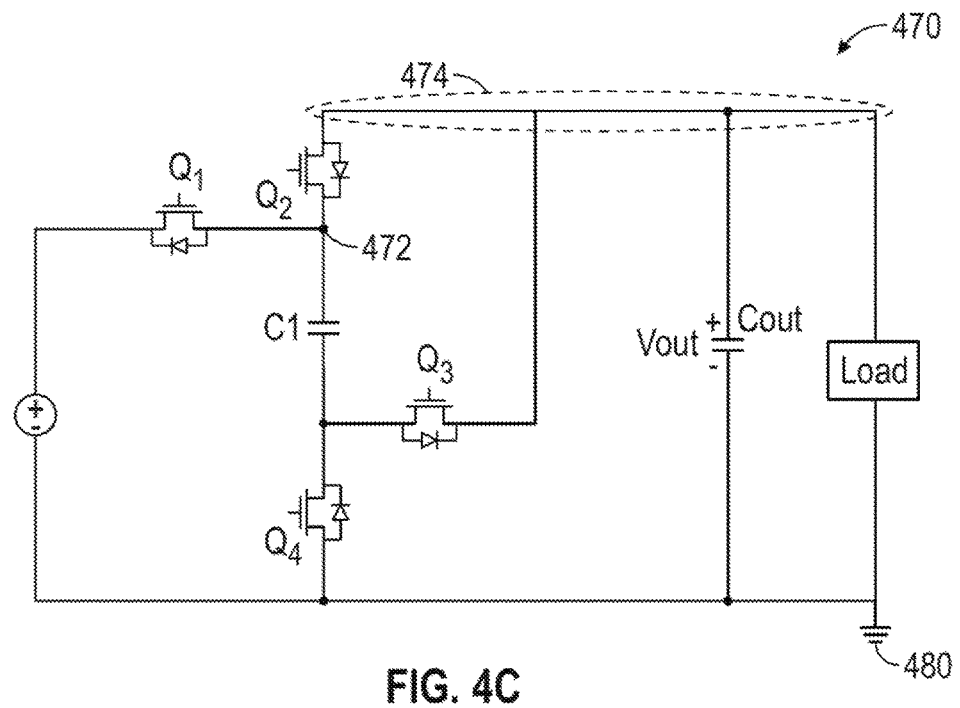

FIGS. 4A-4C are circuit diagrams of exemplary switched capacitor converters, according to some embodiments. In some embodiments, FIG. 4A shows an exemplary Ladder charge pump circuit 420 that includes switching transistors Q1, Q2, Q3, Q4, Q5, Q6, Q7, and Q8 that may switch on or off according to a switching cycle. The switching cycle may include two or more switching signals with two or more duty cycles as shown in FIG. 1B. In some embodiments switching transistors Q1, Q3, Q5, and Q7 may switch on or off together but complementary to switching transistors Q2, Q4, Q6, and Q8. In some examples switching transistors Q1, Q3, Q5, and Q7 and also switching transistors Q2, Q4, Q6, and Q8 may be switched at a 500/% duty cycle. In some embodiments, charge pump circuit 420 includes five flying capacitors C1, C2, C3, C4, and C5 and also includes an output capacitor Cout. Output voltage Vout of the charge pump circuit 420 may be provided across output capacitor Cout between node 422 and ground 430 as shown in FIG. 4A to drive a load.

In some embodiments, pre-balancing circuit 250 of FIG. 2 may be coupled to charge pump circuit 420 to pre-balance charge pump circuit 420. In some embodiments, node 424 of FIG. 4A may be coupled to negative input of comparator 222 to compare a voltage of flying capacitor C1, C2, and C3, in series, with Vlow. Additionally, node 424 may also be coupled via switch 220 to current source 218. Node 422 may be coupled to voltage divider 238 and current source 216. As discussed above, during discharging, switching transistors Q1-Q8 may stay turned off and flying capacitors C1-C5 may be discharged by current source 218 so that the voltages of flying capacitors C1-C5 reach one or more predetermined values, e.g., first values. In some examples, current source 218 may also be coupled, via switch 220, to nodes 426, 428, 432, and 434 to expedite the discharging of the flying capacitors. During charging of flying capacitors C1-C5, current source 216 may be coupled to node 422 and by switching on or off the switching transistors Q2-Q8, flying capacitors C1-C5 may charge so that the voltages of flying capacitors C1-C5 reach predetermined values, e.g., second values. During steady state operation, which happens after pre-charging the flying capacitors to one or more predetermined second values, switching transistors Q1-Q8 may turn on or off according to the switching cycle to keep an essentially constant output voltage Vout.

In some embodiments, FIG. 4B shows an exemplary Fibonacci charge pump circuit 450 that includes switching transistors Q1, Q2, Q3, Q4, Q5, Q6, Q7, Q8, Q9, and Q10 that may switch on or off according to a switching cycle. The switching cycle may include two or more switching signals with two or more duty cycles as shown in FIG. 1B. In some embodiments switching transistors Q1, Q3, Q5, Q7, and Q9 may switch on or off together but complementary to switching transistors Q2, Q4, Q6, Q8, and Q10. In some examples switching transistors Q1, Q3, Q5, Q7, and Q9 and also switching transistors Q2, Q4, Q6, Q8, and Q10 may be switched at a 50% duty cycle. In some embodiments, charge pump circuit 450 includes three flying capacitors C1, C2, and C3 and also includes an output capacitor Cout. Output voltage Vout of the charge pump circuit 450 may be provided across output capacitor Cout between node 448 and ground 440 as shown in FIG. 4B to drive a load.

In some embodiments, pre-balancing circuit 250 of FIG. 2 may be coupled to charge pump circuit 450 to pre-balance charge pump circuit 450. In some embodiments, node 442 of FIG. 4B may be coupled to negative input of comparator 222 to compare a voltage of a top plate of flying capacitor C1 with Vlow. Additionally, node 442 may also be coupled via switch 220 to current source 218. Node 448 may be coupled to voltage divider 238 and current source 216. As discussed above, during discharging, switching transistors Q1-Q10 may stay turned off and flying capacitors C1-C3 may be discharged by current source 218 so that the voltages of flying capacitors C1-C3 reach one or more predetermined values, e.g., first values. In some examples, current source 218 may also be coupled, via switch 220, to nodes 444 and 446 to expedite the discharging of the flying capacitors. During charging of flying capacitors C1-C3, current source 216 may be coupled to node 448 and by switching on or off the switching transistors Q2-Q10, flying capacitors C1-C3 may charge so that the voltages of flying capacitors C1-C3 reach predetermined values, e.g., second values. During steady state operation, which happens after pre-charging the flying capacitors to one or more predetermined second values, switching transistors Q1-Q10 may turn on or off according to the switching cycle to keep an essentially constant output voltage Vout.

In some embodiments, FIG. 4C shows an exemplary 2x doubler/divider charge pump circuit 470 that includes switching transistors Q1, Q2, Q3, and Q4 that may switch on or off according to a switching cycle. The switching cycle may include two or more switching signals with two or more duty cycles as shown in FIG. 1B. In some embodiments switching transistors Q1 and Q3 may switch on or off together but complementary to switching transistors Q2 and Q4. In some examples switching transistors Q1 and Q3 and also switching transistors Q2 and Q4 may be switched at a 50% duty cycle. In some embodiments, charge pump circuit 470 includes a flying capacitors C1 and also includes an output capacitor Cout. Output voltage Vout of the charge pump circuit 470 may be provided across output capacitor Cout between node 474 and ground 480 as shown in FIG. 4C to drive a load.

In some embodiments, pre-balancing circuit 250 of FIG. 2 may be coupled to charge pump circuit 470 to pre-balance charge pump circuit 470. In some embodiments, node 472 of FIG. 4C may be coupled to negative input of comparator 222 to compare a voltage of a top plate of flying capacitor C1 with Vlow. Additionally, node 472 may also be coupled via switch 220 to current source 218. Node 474 may be coupled to voltage divider 238 and current source 216. As discussed above, during discharging, switching transistors Q1-Q4 may stay turned off and flying capacitor C1 may be discharged by current source 218 so that the voltages of flying capacitors C1 may reach a predetermined value, e.g., a first value. During charging of flying capacitor C1, current source 216 may be coupled to node 474 and by switching on or off the switching transistors Q2-Q4, flying capacitor C1 may charge so that the voltages of flying capacitor C1 may reach a predetermined value, e.g., a second value. During steady state operation, which happens after pre-charging the flying capacitors to one or more predetermined second values, switching transistors Q1-Q4 may turn on or off according to the switching cycle to keep an essentially constant output voltage Vout.

Figure 5:
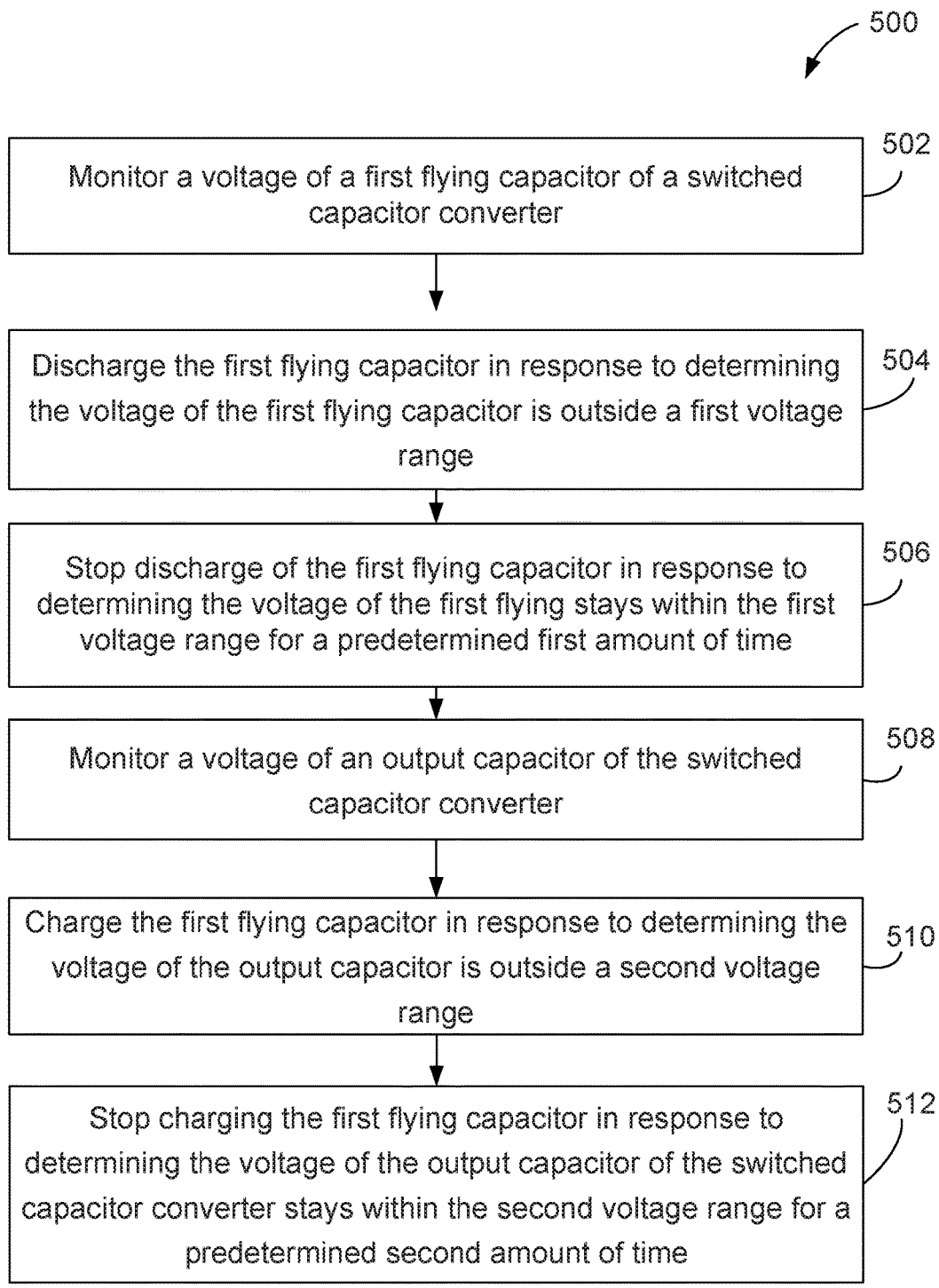
FIG. 5 is a flowchart of an exemplary process for operating a switched capacitor converter, according to some embodiments.

FIG. 5 is a flowchart of an exemplary process for operating a switched capacitor converter, according to some embodiments. For explanatory purposes, the various blocks of exemplary process 500 are described herein with reference to FIG. 1A and FIGS. 2-3, and the components and/or processes described herein. The one or more of the blocks of exemplary process 500 may be implemented, for example, by any of the switched capacitor converter circuits described herein. In some implementations, one or more of the blocks may be implemented apart from other blocks, and by one or more different processors or devices. Further for explanatory purposes, the blocks of exemplary process 500 are described as occurring in serial, or linearly. However, multiple blocks of exemplary process 500 may occur in parallel. In addition, the blocks of exemplary process 500 need not be performed in the order shown and/or one or more of the blocks of exemplary process 500 need not be performed.

The process 500 begins at step 502; a voltage of a first flying capacitor of a switched capacitor converter is monitored. In some embodiments, as shown in FIG. 2, voltage of node 120 (Vsw1) of primary switching circuit 130 relative to ground 102 which may be the voltage of the top plate of flying capacitor C1 is monitored. The monitoring is performed by comparator 222 that receives Vsw1 at its negative input and also receives a reference voltage Vlow at its positive input and continuously compares Vsw1 with Vlow. When Vsw1 is greater than Vlow, output 226 of comparator 222 may generate a low voltage and when Vsw1 is smaller than Vlow, output 226 of comparator 222 may generate a high voltage.

In step 504, the first flying capacitor is discharged in response to determining the voltage of the first flying capacitor is outside a first voltage range. In some examples, during discharging, the switching transistors of the primary switching circuit are turned off. In some embodiments, as shown in FIG. 2 after determining Vsw1 is above Vlow, output 226 of comparator 222 may go low. Output 226 being low may command switch 220 to close and to connect current source 218 between node 120 of primary switching circuit 130 and ground 102 and draw current Idisc from node 120 to discharge flying capacitor C1. Flying capacitors C2 and C3 may also be discharge through body diodes of switching transistors Q2 and Q3. During discharging flying capacitors C1, C2, and C3 may be coupled to ground 102 via body diodes of switching transistors Q6 and Q8.

In step 506, discharge of the first flying capacitor is stopped in response to determining the voltage of the first flying capacitor of the switched capacitor converter stays within the first voltage range for a predetermined first amount of time. In some examples, comparator 222 determines if Vsw1 is below Vlow for about 15 switching cycles and then output 226 of comparator 222 goes high and switch 220 becomes opened and Idisc becomes disconnected from node 120. Thus, discharging of the flying capacitors stops. In some examples, the switching frequency is about 500 KHz a cycle of the switching signals is about 2 micro seconds.

In step 508, a voltage of an output capacitor of the switched capacitor converter is monitored. In some examples, as shown in FIG. 2, the monitoring is performed by comparator system 236. As discussed with respect to FIG. 2, comparator system 236 receives the output voltage Vout and compares the output voltage with a fraction, e.g., one fourth, of the input voltage Vin. In some examples, when Vout is not equal to ¼ Vin, output of comparator system 236 goes high and when Vout is equal to ¼ Vin, output of comparator system 236 goes low. When output of comparator system 236 goes high, output of comparator system 236 closes switch 228 and thus connects current source 216 to node 112 of primary switching circuit 130. At the same time, output 232 of comparator system 236 is coupled to logic circuit 202. The output of comparator system 236 being high may command logic circuit to provide switching signals for switching transistor Q2-Q8. Thus, by connection current source current Ichr to primary switching circuit 130 and switching on or off the switching transistor Q2-Q8, the flying capacitors C1, C2, and C3 may be charged to predetermined voltage values. In some examples, hysteresis voltages are used in comparator system 236 such that when the output 232 of comparator system 236 is within a range around ¼ Vin, the output of comparator system 236 goes low. And when the output 232 of comparator system 236 is outside the range around ¼ Vin, the output 232 of comparator system 236 goes high.

In step 510, the first flying capacitor is charged in response to determining the voltage of the output capacitor is outside a second voltage range. As described, the voltage of output capacitor is Vout and comparator system 236 of FIG. 2 may compare output voltage Vout with a desired voltage, e.g., ¼ Vin and when the output voltage Vout is not within a predetermined range of ¼ Vin, the charging of the flying capacitors continues.

In step 512, charging the first flying capacitor is stopped in response to determining the voltage of the output capacitor of the switched capacitor converter stays within the second voltage range for a predetermined second amount of time. In some examples, when comparator system 236 determines that the output voltage is within a second voltage range then switching transistor Q1 start switching on or off and current source 216 is disconnected from primary switching system and charging of flying capacitors stops. After charging the flying capacitors stops, switched capacitor converter 100 enters a steady state operation and Q-Q8 continue switching on or off according to switching cycle 160. In some examples, the predetermined second amount of time may essentially be zero and when comparator system 236 determines that the output voltage is within the second voltage range, charging of flying capacitors stops.

Figure 6:
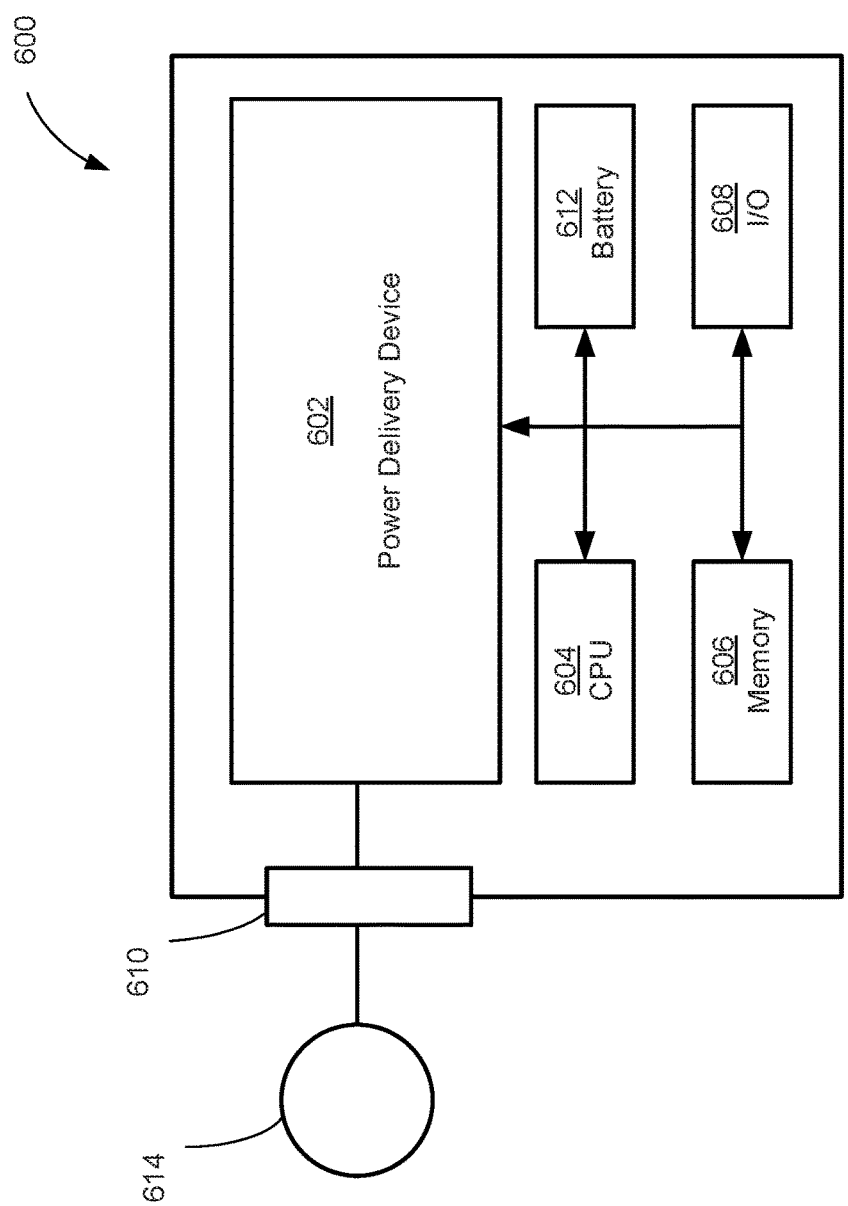
FIG. 6 is a diagram of an exemplary electronic system that implements a switched capacitor converter, according to some embodiments.

FIG. 6 is a diagram of an exemplary electronic system that implements a switched capacitor converter, according to some embodiments. Electronic system 600, in combination with the disclosure regarding FIG. 2, may be any electronic device utilizing power from a power source. For example, electronic system 600 may be representative of a computing device (e.g., a personal computer or a mobile device such as a smartphone, tablet computer, laptop, PDA, a wearable such as a watch or band, or combination thereof), or a consumer appliance, television or other display device, radio or telephone, home audio system, or the like.

In some implementations, electronic system may include a power delivery device 602 (e.g., a power supply) and a load. The load may include various components of electronic system 600, including one or more of a central processing unit (CPU) 604, various memory systems 606, one or more input and/or output (I/O) devices 608, a power interface 610, and one or more batteries 612. The CPU 604 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

A memory system 606 may include, for example, volatile memory used to temporarily store data and information used to manage electronic system 600, a random access memory (RAM), and/or non-volatile memory such as a magnetic disk, flash memory, peripheral SSD, and the like. I/O device 608 may include an input device such as a keyboard, a touch screen, a touch pad, voice control system, or other device for input of data. I/O device 608 may include an output device such as a display device, audio device (e.g., a speaker), or data interface (e.g., a host data bus) for output of data. In some implementations, one or more elements of electronic system 600 can be integrated into a single chip. In some implementations, the elements can be implemented on two or more discrete components.

Power delivery device 602 may include any of the previously described power converter circuits (including an auxiliary bypass circuit), including a corresponding control circuit. Accordingly, power delivery device 602 may be configured (e.g., as a step up or step down converter) to convert a first voltage to a second voltage, different from the first voltage. Power delivery device 602 may receive an input power (e.g., at a voltage Vin) from an external power source 614 via power interface 610. The input power may be a DC power. In some implementations, the input power may be an alternating current source that is converted to DC (e.g., by power interface 610) before being utilized by power delivery device 602. Additionally or in the alternative, the input power may be DC from battery 612.

Power delivery device 602 may produce a voltage according to the load requirements of various components of electronic system 600. In this regard, power delivery device 602 may implement multiple different types of converter circuits to accommodate different load requirements of the various components of electronic system 600. Additionally or in the alternative, power delivery device 602 may be configured to provide charge to battery 612 (e.g., as part of a battery charger system) based on power from external power source 614.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus, the accompanying method claims present elements of the various steps in a sample order, and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a circuit or processor configured to monitor and control an operation or a component may also mean the circuit or processor being programmed to monitor and control the operation or being operable to monitor and control the operation. Likewise, a circuit or processor configured to execute code may be construed as a circuit or processor programmed to execute code or operable to execute code.

The terms "start-up" and "power-up" are intended to include, but not be limited to, the plain meaning of each respective term, and for the purposes of this disclosure may be used interchangeably. The terms "start-up" and "power-up" may include, for example, a point in time at which a circuit is turned on (e.g., started) and/or a period of time shortly thereafter.

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

What is claimed is:

1. A switched capacitor converter, comprising:
   a primary switching circuit comprising:
      a plurality of switching transistors connected in series; and
      an output capacitor and one or more flying capacitors including a first flying capacitor; and
   a pre-balancing circuit comprising:
      a first comparator circuit of one or more comparator circuits configured to monitor a voltage of the first flying capacitor of the primary switching circuit and, when the voltage of the first flying capacitor is outside a first voltage range, to activate a first current source of one or more current sources coupled to the first flying capacitor to discharge the first flying capacitor until the voltage of the first flying capacitor is within the first voltage range for a predetermined first amount of time, wherein the first comparator circuit is configured to keep the plurality of switching transistors of the primary switching circuit turned off when the first current source is activated; and
      a second comparator circuit of the one or more comparator circuits configured to monitor a voltage of the output capacitor of the primary switching circuit and, when the voltage of the output capacitor is outside a second voltage range, to activate a second current source of the one or more current sources coupled to the first flying capacitor to charge the first flying capacitor until the voltage of the output capacitor is within the second voltage range for a predetermined second amount of time, wherein when the second current source is activated, the second comparator circuit is configured to keep at least one of the plurality of switching transistors of the primary switching circuit turned off and to turn on or off one or more remaining switching transistors of the plurality of switching transistors of the primary switching circuit according to a switching cycle.

2. The switched capacitor converter of claim 1, wherein the first current source is configured, when activated, to draw a first discharge current from the first flying capacitor.

3. The switched capacitor converter of claim 1, wherein the first comparator circuit is configured to deactivate the first current source coupled to the first flying capacitor when the voltage of the first flying capacitor is within the first voltage range for the predetermined first amount of time; and
   wherein the second comparator circuit is configured to deactivate the second current source coupled to the first flying capacitor when the voltage of the output capacitor reaches the second voltage range.

4. The switched capacitor converter of claim 1, wherein the pre-balancing circuit further comprises a logic circuit, the logic circuit is coupled to the primary switching circuit and is configured to generate switching signals for the plurality of switching transistors of the primary switching circuit to switch the plurality of switching transistors on or off.

5. The switched capacitor converter of claim 4, wherein a pre-balancing of the switched capacitor converter is completed when the second current source is deactivated, wherein after completion of the pre-balancing, the second comparator circuit is configured to continue monitoring the voltage of the output capacitor of the primary switching circuit, and wherein, based on the monitoring, the second comparator circuit is configured to command the logic circuit to generate switching signals for the plurality of switching transistors of the primary switching circuit according to the switching cycle to keep the voltage of the output capacitor within the second voltage range.

6. The switched capacitor converter of claim 1, wherein the switching cycle comprises two or more switching signals with two or more duty cycles, and wherein a voltage of the output capacitor is an output voltage of the switched capacitor converter.

7. The switched capacitor converter of claim 1, wherein each one of the plurality of switching transistors are linked to an adjacent transistor of the plurality of switching transistors by a respective node of a plurality of nodes that include a first node, a second node, and a third node;
   wherein the one or more flying capacitors comprises three flying capacitors that include the first flying capacitor, and wherein the three flying capacitors are coupled from one end to the first node, the second node, and the third node and are coupled from another end to a ground; and
wherein discharging the first flying capacitor is configured to discharge the three flying capacitors.

8. The switched capacitor converter of claim 4, further comprising:
a secondary switching circuit comprising a parallel pair of switching transistor sets, wherein each switching transistor set comprises two switching transistors connected in series via a joining node linking the two switching transistors, the logic circuit is coupled to the switching transistors of the secondary switching circuit and is configured to provide the switching signals according to the switching cycle for the switching transistors of the secondary switching circuit.

9. The switched capacitor converter of claim 8, wherein when the one or more flying capacitors are charging:
the logic circuit is configured to provide the switching signals according to the switching cycle for the switching transistors of the secondary switching circuit to turn on or off; and
the secondary switching circuit is configured to provide one or more first paths for charging the one or more flying capacitors.

10. The switched capacitor converter of claim 8, wherein when the one or more flying capacitors are discharging:
the logic circuit is configured to keep the switching transistors of the secondary switching circuit to turned off; and
the secondary switching circuit is configured to provide one or more second paths for discharging the one or more flying capacitors via body diodes of the switching transistors of the secondary switching circuit.

11. The switched capacitor converter of claim 1, further comprising:
an input voltage source coupled to the primary switching circuit to provide an input voltage, wherein an input capacitor is coupled across the input voltage source,
wherein the second voltage range comprises a predefined boundary around a predefined fraction of the input voltage.

12. The switched capacitor converter of claim 11, wherein the first flying capacitor is configured to be pre-charged to three quarter of the input voltage.

13. The switched capacitor converter of claim 1, wherein charging the first flying capacitor is configured to charge the three flying capacitors.

14. The switched capacitor converter of claim 12, wherein a second flying capacitor is configured to be charged to half of the input voltage and a third capacitor is configured to be charge to a quarter of the input voltage.

15. A method of operating a switched capacitor converter, comprising:
monitoring a voltage of a first flying capacitor of one or more flying capacitors of a primary switching circuit of the switched capacitor converter, the primary switching circuit comprising a plurality of switching transistors;
discharging the first flying capacitor in response to determining the voltage of the first flying capacitor is outside a first voltage range, wherein the plurality of switching transistors of the primary switching circuit is turned off when discharging;
end the discharging of the first flying capacitor in response to determining the voltage of the first flying capacitor of the switched capacitor converter is within the first voltage range for a predetermined first amount of time;
monitoring a voltage of an output capacitor of the switched capacitor converter;
charging the first flying capacitor in response to determining the voltage of the output capacitor is outside a second voltage range, wherein at least one of the plurality of switching transistors of the primary switching circuit is turned off when charging, and wherein one or more remaining switching transistors of the plurality of switching transistors of the primary switching circuit turn on or off according to a switching cycle when charging; and
end the charging of the first flying capacitor in response to determining the voltage of the output capacitor of the switched capacitor converter is within the second voltage range for a predetermined second amount of time, wherein turn on or off the plurality of switching transistors of the primary switching circuit according to the switching cycle when charging ends.

16. The method of claim 15, wherein the switching cycle comprises two or more switching signals with two or more duty cycles, and wherein a voltage of the output capacitor is an output voltage of the switched capacitor converter.

17. The method of claim 16, wherein two of the switching signals are complementary to each other and have a duty cycle of 50 percent.

18. The method of claim 15, wherein the second voltage range comprises a predefined boundary around a predefined fraction of an input voltage, the input voltage is provided by an input voltage source that is coupled to the primary switching circuit.

19. The method of claim 15, wherein a secondary switching circuit comprising a parallel pair of switching transistor sets coupled to the primary switching circuit and to the one or more flying capacitors to provide one or more paths for charging the flying capacitors, wherein each switching transistor set comprises two switching transistors connected in series via a joining node linking the two switching transistors.

20. A switched capacitor converter, comprising:
means for turning off switching transistors of a primary switching circuit when discharging begins;
means for monitoring a voltage of a first flying capacitor;
means for discharging the first flying capacitor in response to determining the voltage of the first flying capacitor is outside a first voltage range;
means for ending the discharging of the first flying capacitor in response to determining the voltage of the first flying capacitor of the switched capacitor converter is within the first voltage range for a predetermined first amount of time;
means for charging the first flying capacitor in response to determining the voltage of an output capacitor is outside a second voltage range;
means for ending the charging the first flying capacitor in response to determining the voltage of the output capacitor of the switched capacitor converter is within the second voltage range; and
means for start switching on or off the switching transistors of the primary switching circuit according to a switching cycle when charging stops.

* * * * *